Nov. 16, 1943.           R. G. AURIEN                2,334,168
                        BRAKE ARRANGEMENT
                       Filed Dec. 4, 1940            3 Sheets-Sheet 1

INVENTOR.
Ray G. Aurien,
BY

Nov. 16, 1943.   R. G. AURIEN   2,334,168
BRAKE ARRANGEMENT
Filed Dec. 4, 1940   3 Sheets-Sheet 3

INVENTOR.
Ray G. Aurien,
BY
atty.

Patented Nov. 16, 1943

2,334,168

UNITED STATES PATENT OFFICE 2,334,168

BRAKE ARRANGEMENT

Ray G. Aurien, Chicago, Ill., assignor to American Steel Foundries, Chicago, Ill., a corporation of New Jersey Application December 4, 1940, Serial No. 368,413

22 Claims. (Cl. 188—59)

My invention relates to a brake arrangement and more particularly to disk type brakes having interleaved rotating and nonrotating elements supported between the wheels of a railway wheel and axle assembly and movable into tight frictional engagement.

An object of my invention is to support the nonrotating elements and operating means for such a disk brake from journal means outboard the wheels of a railway wheel and axle assembly.

Another object of my invention is to design a disk type brake operable between the wheels of a railway wheel and axle assembly wherein the rotors are supported in novel manner around the axle and are driven by a connection to one wheel.

A further object of my invention is to afford novel release means of resilient material for the rotors, said release means being of annular form and encircling the axle.

My invention also comprehends supporting a disk brake intermediate the wheels of a railway wheel and axle assembly wherein the stators and power means are formed in two complementary sections which encircle the axle and afford convenient means for dismantling the disk brake.

Still another object of my invention is to afford a brake carrier device which supports braking elements intermediate the wheels of a railway wheel and axle assembly from journal boxes outboard the wheels.

In the drawings, Figure 1 is a plan view of a railway car truck embodying my invention.

Figure 2 is a side elevation of the car truck shown in Figure 1, the left half thereof being a view taken substantially along the lines 2—2 of Figure 1. The right wheel and axle assembly of Figure 2 is shown in section, the left half thereof being a sectional view taken substantially in a vertical plane through the brake cylinders and bisecting the truck longitudinally as indicated by the line B—B of Figure 1. The upper right quarter view is a section taken substantially in a vertical plane indicated by the line C—C of Figure 4, and the lower right quarter view is a section taken in a vertical plane indicated by the line D—D of Figure 4.

Figure 4 is a sectional end view of the wheel and axle assembly shown in Figure 3, the left half thereof being taken along the vertical planes indicated by the lines 4—4 of Figure 2, and the right half thereof being a section taken in the vertical transverse plane bisecting the wheel and axle assembly as indicated by the line 4A—4A of Figure 2.

Figure 1:
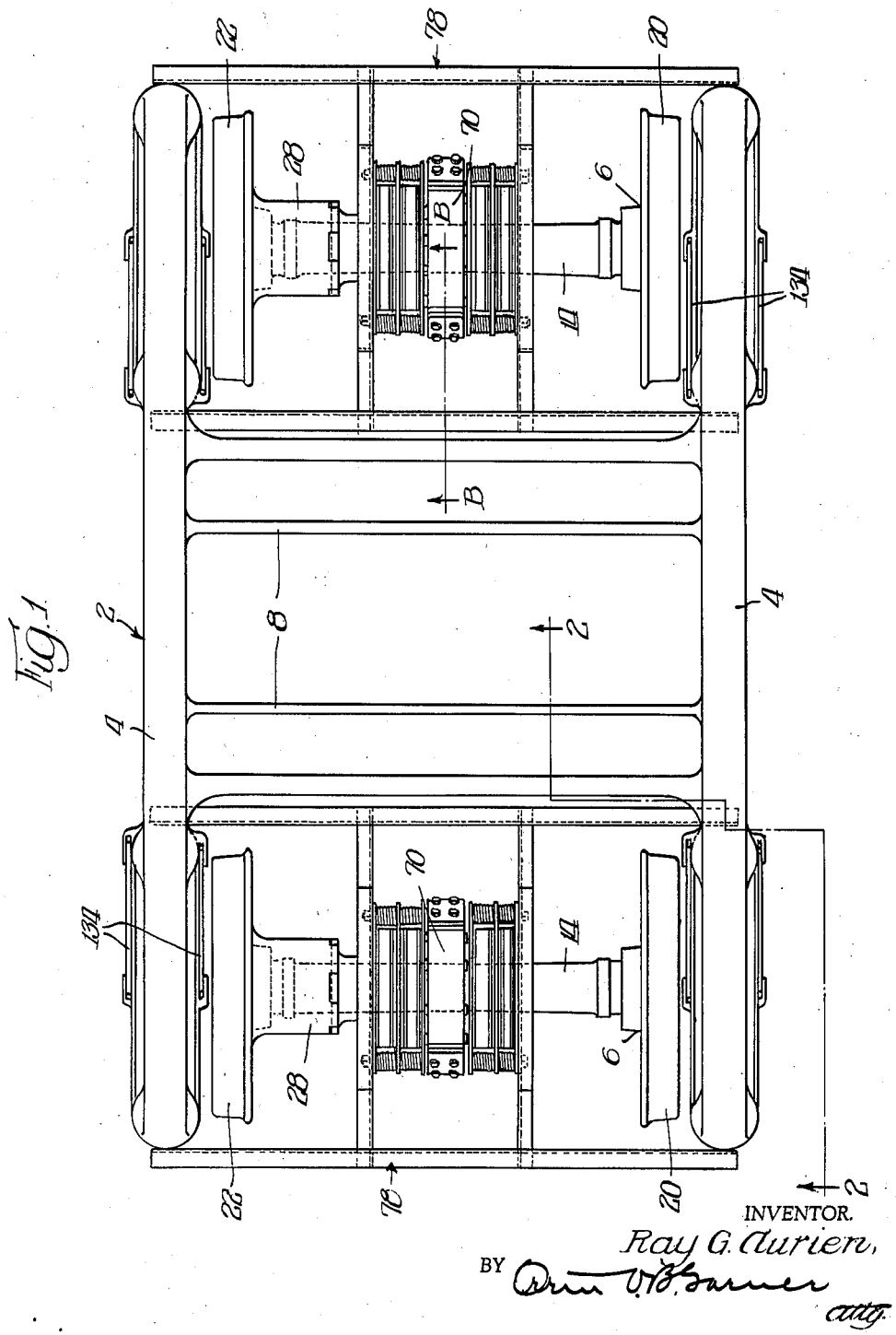

In the drawings certain details are omitted from each figure where they are better shown in other figures.

As shown in Figure 1, my novel braking means may be embodied in a conventional railway car truck generally indicated at 2 which comprises spaced side frames 4, 4 supported at opposite ends by wheel and axle assemblies 6, 6. Spaced transoms 8, 8 extend between said side frames 4, 4 intermediate the wheel and axle assemblies and are integrally joined with said side frames. Resiliently supported in customary manner between said transoms may be a bolster (not shown) affording a connection to a car body (not shown). Adjacent to the ends of each side frame may be formed spaced pedestal jaws 10, 10 which slidingly engage opposite sides of journal boxes 12, 12. The journal ends of the axle 14 project outboard the wheels and may be received in said journal boxes 12, 12 in usual manner. On opposite sides of each journal box 12 are formed wing portions 16, 16 affording seats for spring means diagrammatically indicated at 18, 18 interposed between the top member of the side frame and said wing portions 16, 16.

The wheels 20 and 22 may be press-fitted on opposite ends of each axle 14 and the hub 24 of each wheel 22 may be relieved to afford an inboard annular bearing portion 26 concentric with the axle 14. A relatively short section of a cylindrical member or torque tube 28, which encircles the axle 14 adjacent the wheel 22, may be press-fitted as at 30 on an annular bearing portion 26. An outwardly flaring annular flange 32 integrally formed on the outboard end of tube 28 may be seated as at 34 against the plate of the wheel 36 and may be secured thereto in any convenient manner as by nut and bolt assemblies (not shown). Assembly of tube 28 and wheel 22 may be facilitated by fitting the tube on the wheel hub before the wheel is press-fitted on the axle. It is understood, of course, that the tube may be formed in two complementary sections and secured to the wheel in any convenient manner in concentric relationship with the axle 14.

On the inboard end of the tube 28 may be formed a series of spaced lugs 38, 38 which interlock as at 40, 40 with spaced radially outwardly projecting members 42, 42 on an annular flange 44 formed at one end of the rotor supporting sleeve 46, thus forming what is sometimes designated a positive clutch or jaw clutch connection. The sleeve 46 is thus driven in rotation with the wheel.

The rotor supporting sleeve 46 encircles the central portion of the axle 14 intermediate the wheels 20 and 22 and may comprise two complementary sections secured together adjacent to their opposite ends by nut and bolt assemblies 48, 48 extending through aligned lugs 50, 50 on said sleeve above and below said axle.

At its center portion the inner surfaces of the sleeve 46 may be relieved at 51 to afford clearance from the resilient sleeve 52 which is interposed between the sleeve 46 and the axle 14. The resilient sleeve 52 may comprise two complementary sections to facilitate assembly and may be formed of any suitable resilient material such as rubber composition. Those skilled in the art will understand that the resilient sleeve permits deflection of the central portion of the axle 14 and thereby reduces to a minimum concentration of stresses in said axle at opposite ends of the rotor supporting sleeve 46.

Around said sleeve 46 and at each side of the longitudinal center line of the car truck are arranged a plurality of interleaved rotors and stators serving as braking means. Each rotor 54 comprises two semi-circular disks supported by the sleeve 46 through rotor supporting bolts 56, 56 (Figures 2 and 3) disposed parallel to the axis of the axle, each semi-circular disk being supported by two bolts 56, 56. The bolts 56, 56 extend through inner circumferential portions of said rotors 54, 54 and through ears 58, 58 (Figure 2) on the spaced annular flanges 60, 60 and the outboard annular flange 62 integrally formed around the rotor supporting sleeve 46. Each rotor 54 slidingly engages the sleeve 46 as at 64 and is axially movable along the bolts 56, 56. Inboard movement of said rotors is limited during release by abutment as at 66, 66 against the adjacent annular flanges 60, 60. Wear plates 68, 68 may be secured to opposite faces of each rotor 54 in any convenient manner.

The brake cylinder device 70 and each inboard stator 72, intermediate stator 74, and outboard stator 76 may be supported intermediate the wheels by a brake carrier generally indicated at 78 (Figure 3) mounted outboard the wheels 20 and 22 on the journal boxes 12, 12. The brake carrier 78 embraces the associated wheel and axle assembly and includes transverse channel members 80, 80 disposed at opposite sides of the wheel and axle assembly. The ends of the channel members 80, 80 may be secured as at 82, 82 to lugs 84, 84 (Figure 2) of bolt-like form, each extending outwardly from a wing portion 16 and through an opening in the adjacent end of the channel member 80. A filler 85 is secured in any convenient manner to the channel member 80 and resilient bushings 86, 86 may be interposed between said filler and the lug 84. A retaining nut 88 is threaded on the end of the lug 84.

Intermediate the wheels the spaced channel members are joined by the spaced longitudinal members 90, 90 extending beneath the axle 14. Each member 90 is afforded at opposite ends box sections 92, 92 and over each box section 92 may be sleeved a resilient member 94 affording a resilient connection to the adjacent transverse member 80. The ends 92, 92 are retained on said members 80, 80 by U-clamps 96, 96 secured thereto by nut and bolt assemblies 98, 98.

On each side of the axle 14 each longitudinal member 90 is formed with a web 100 having a top flange approximately level with the axis of the axle 14. Secured to said webs 100, 100 in any convenient manner as by spaced nut and bolt assemblies 104, 104 may be backing plates 102, 102 extending above and over the axle 14.

Each annular stator 72, 74, and 76 may comprise two complementary portions, one portion being disposed over the axle 14 and the other portion being disposed beneath the axle 14. On opposite sides of each stator may be formed outwardly projecting arms 106, 106 having aligned openings through which extend stator supporting bolts 108, 108, said bolts 108, 108 also extending through the respective backing plates 102, 102 and the longitudinal members 90, 90 for threaded engagement at opposite ends with securing nuts 110, 110. Each inboard stator 72 is positioned in abutment with the brake cylinder device 70 and each intermediate stator 74 is afforded abutment with the shoulders 112, 112 on the stator supporting bolts 108, 108. Each outboard stator is seated against the backing plate 102 and the longitudinal member 90 as at 114.

Figure 2:
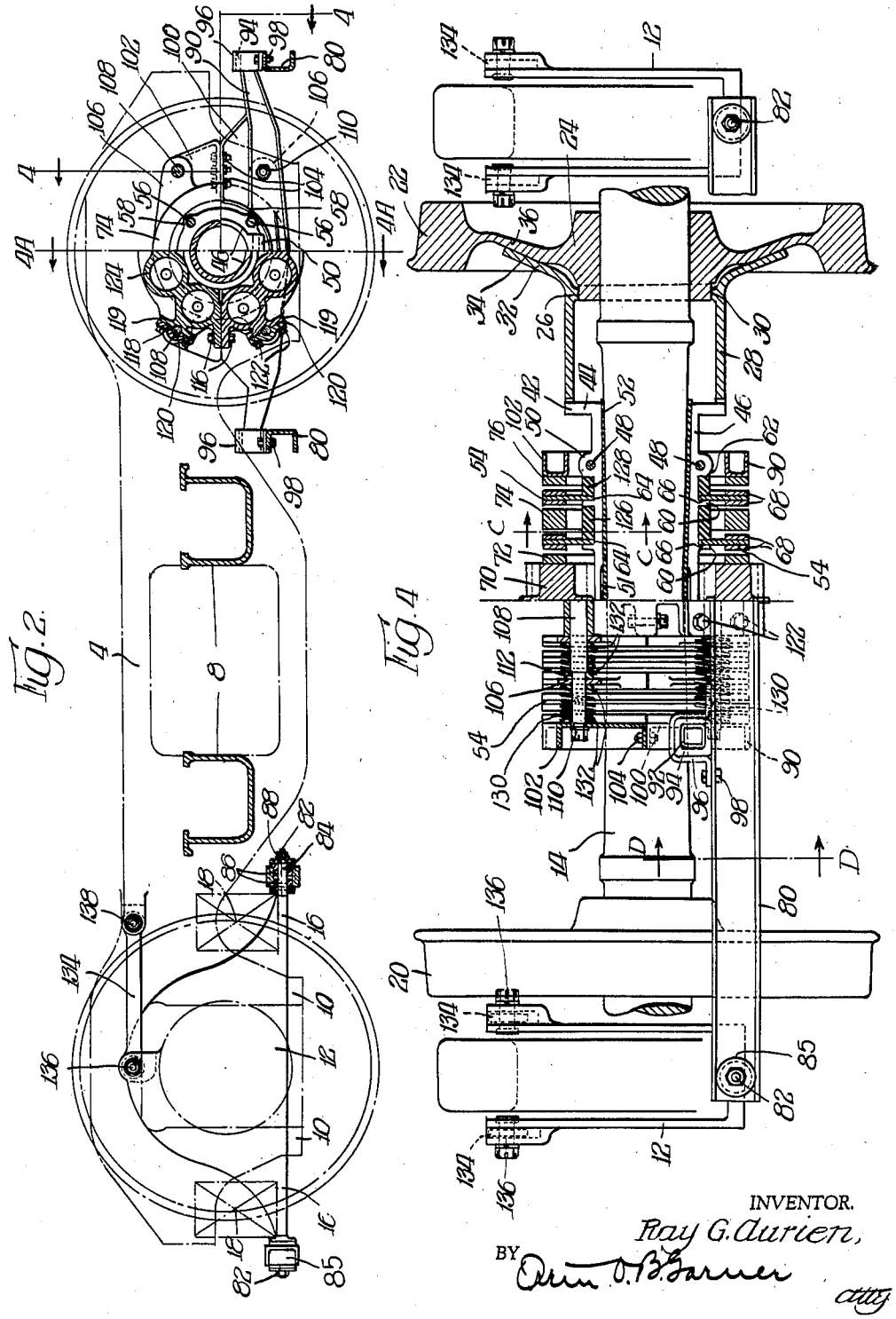
Figure 3:
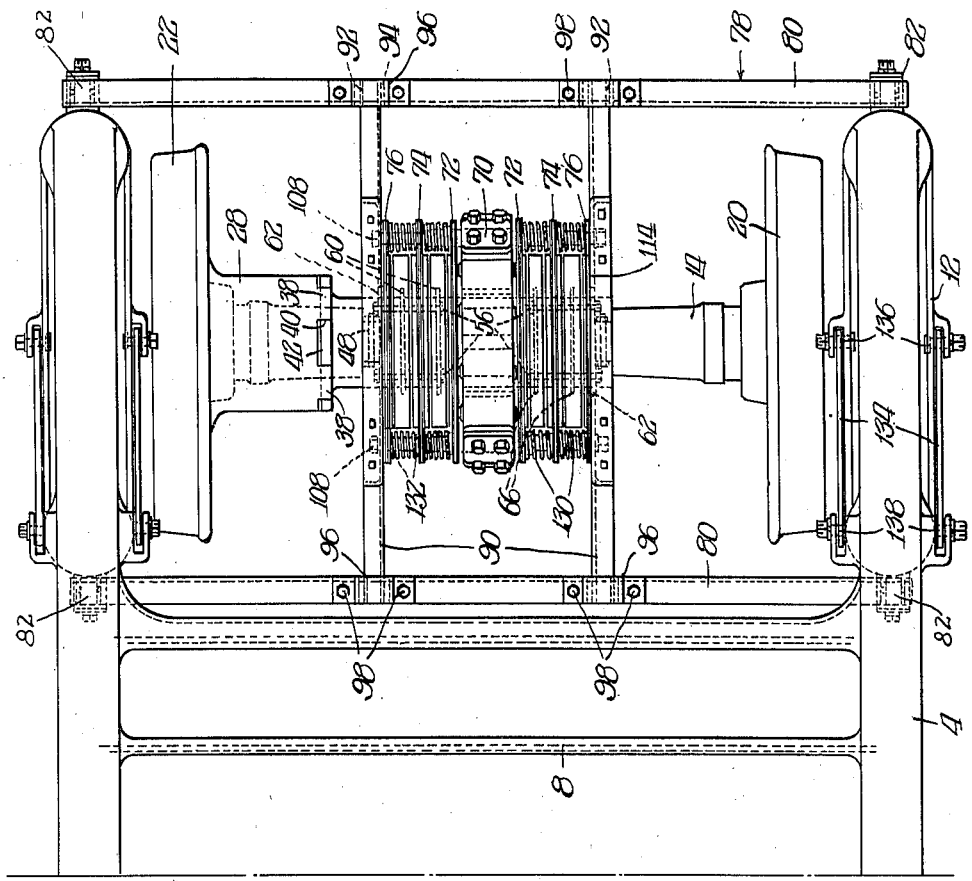
Figure 3 is an enlarged plan view of the right wheel and axle assembly shown in Figure 1.

As best shown in Figure 2 the brake cylinder device 70 is supported by the stator supporting bolts 108, 109 and comprises an upper and lower section secured together at opposite sides by nut and bolt assemblies 116, 116. The stator bolts 108, 108 may be received in complementary recesses 118, 118 on brackets 119, 119 formed on the cylinder device 70 and a clamp 120 is secured over each bolt 108 by nut and bolt assemblies 122, 122. The brake cylinder device 70 comprises a plurality of double-acting cylinders 124, 124 spaced around the axle 14, each cylinder 124 having pistons therein (not shown) which are urged outwardly in opposite directions upon application of the power means.

Release means for the rotors 54, 54 include rings 126 and 128 of resilient material interposed between inner peripheral portions of the rotors 54, 54 and the respective flanges 60, 60 and 62 on the rotor supporting sleeve 46. As the rotors are urged outwardly upon application of the power means the resilient rings 126 and 128 are compressed and flow radially outward. Upon release of the power means the resilient rings 126 and 128 urge the rotors 54, 54 inboardly into abutment with the associated annular flanges 60, 60 on the sleeve 46.

Release means for the stators comprise coil springs 130, 130 sleeved over the stator supporting bolts 108, 108 between stators 72 and 74, and 74 and 76. Washers 132, 132 may be secured to said stators for positioning the ends of the release springs 130, 130. Upon application of the braking means the release springs 130, 130 are compressed between the stators and upon release of the power means the springs 130, 130 move the stators into their normal released positions.

It is apparent that the stators and brake cylinder device may be easily dismantled by removing bolts 104, 104 securing the backing plates 102, 102 to the longitudinal members 90, 90 and bolts 116, 116 which secure together the section of the brake cylinder device. The upper half of the stators and brake cylinder device may then be lifted off the axle 14. The lower half of the stators and braking device may be dismantled by unfastening the connections 82, 82 of the transverse members 80, 80 with the journal boxes and then lowering it from its operative position. In this manner access may be had to the rotors 54, 54 and worn wear plates 68, 68 may be easily replaced.

In operation the pistons in the series of brake cylinders 124, 124 are moved outwardly in opposite directions and urge the stators 72, 72, 74, 74, and the rotors 54, 54 into a compact pile against the outboard stators 76, 76 for frictional engagement. Upon release of the power means the stators and rotors are returned to their normal released positions as aforedescribed.

The brake carrier 78 is held against rotation by the connections 82, 82 of the longitudinal members 80, 80 with the journal boxes 12, 12. Each journal box 12 may be restrained against tipping upon application of the braking means by spaced or paired torque arms 134, 134 connected at corresponding ends to the top of each journal box at 136, 136 and connected at their opposite ends to the side frame 4 at 138, 138.

It may be noted that the thrust acting on one set of stators and rotors is counterbalanced by the thrust acting on the other set of rotors and stators disposed on the other side of the brake cylinder. Thus the journal boxes 12, 12 are substantially free from thrust due to braking.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a vehicle, a frame, a supporting axle with wheels thereon, journal means outboard said wheels, a brake carrier extending between said wheels and resiliently supported from opposite sides of said journal means, stators and power means resiliently supported by said carrier intermediate said wheels, a rotor supporting member encircling said axle and rotatable therewith, resilient means between said member and said axle, and rotors supported by said member and interleaved with said stators, said power means being operable to move said rotors and stators into frictional engagement, and torque arms connecting said journal means to said frame.

2. In a vehicle, a frame, a supporting axle with wheels thereon, journal means outboard said wheels, a brake carrier extending between said wheels and resiliently supported from opposite sides of said journal means, stators and power means resiliently supported by said carrier intermediate said wheels, a rotor supporting member encircling said axle and rotatable therewith, resilient means between said member and said axle, and rotors supported by said member and interleaved with said stators, said power means being operable to move said rotors and stators into frictional engagement.

3. In a vehicle, a frame, a rotating axle having spaced wheels thereon, journal boxes outboard the wheels, a brake carrier supported from opposite sides of said journal boxes, braking means between said wheels comprising stators supported by said carrier, a member sleeved over said axle and having a connection to one of said wheels, rotors supported on said member, actuating means on said carrier operable to frictionally engage said rotors and stators, and resilient means interposed between said member and said axle for reducing to a minimum concentration of stresses in said axle.

4. In a vehicle, a frame, a rotating axle having spaced wheels thereon, journal boxes outboard the wheels, a brake carrier supported from opposite sides of said journal boxes, braking means between said wheels comprising stators supported by said carrier, rotor supporting means encircling said axle and operatively connected to one of said wheels, rotors on said supporting means, actuating means on said carrier to frictionally engage said rotors and stators, and annular resilient members on said rotor supporting means serving as release means for said rotors.

5. In a vehicle, a frame, a supporting axle with wheels thereon, journal means outboard said wheels having below-axle wing portions forming spring seats, a brake carrier extending between said wheels and secured to opposite wing portions of each journal means, stators and power means resiliently supported by said carrier intermediate said wheels, a rotor supporting member encircling said axle and rotatable therewith, and rotors supported by said member and interleaved with said stators, said power means being operable to move said rotors and stators into frictional engagement.

6. In a vehicle, a frame, a rotating axle having spaced wheels thereon, journal boxes outboard the wheels, a brake carrier supported from said journal boxes, braking means between said wheels comprising stators supported by said carrier, a rotor supporting member secured on said axle and operatively connected to one of said wheels, rotors on said member, actuating means on said carrier for urging said rotors and stators into frictional engagement, and resilient means sleeved on said member for release of said rotors.

7. In a vehicle, a frame, supporting wheel and axle assemblies each comprising a rotating axle with wheels thereon, journal means outboard said wheels, braking means between said wheels, a brake carrier including members extending between said journal means at opposite sides of said assembly, said braking means including rotors supported for rotation with said wheels, and stators and actuating means resiliently supported on said carrier, said actuating means being operable to urge said rotors and stators into frictional engagement, the rotor support means comprising a split sleeve resiliently mounted on said axle, and resilient bushings mounted on said sleeve for release of said rotors.

8. In a vehicle, a frame, supporting wheel and axle assemblies each comprising a rotating axle with wheels thereon, journal means outboard said wheels, braking means between said wheels, a brake carrier extending between said journal means and supported from opposite sides thereof, said braking means including rotors supported for rotation with said wheels, and stators and actuating means supported from said carrier, said actuating means being operable to urge said rotors and stators into frictional engagement, the rotor support means comprising a split sleeve resiliently mounted on said axle, and resilient bushings mounted on said sleeve for release of said rotors.

9. In a vehicle, a frame, supporting wheel and axle assemblies each comprising a rotating axle with wheels thereon, journal means outboard said wheels, braking means between said wheels, a brake carrier embracing said wheel and axle assembly and connected to opposite sides of said journal means, said braking means including rotors supported for rotation with said wheels, and stators and actuating means supported from said carrier, said actuating means being operable to urge said rotors and stators into frictional engagement, all of said rotors being supported from a split sleeve resiliently mounted on said axle and having a positive clutch connection with means fixed on one of said wheels.

10. In a vehicle, a frame, supporting wheel and axle assemblies each comprising a rotating axle with wheels thereon, journal means outboard said wheels, braking means between said wheels, a brake carrier supported from opposite sides of said journal means, said braking means including rotors supported for rotation with said wheels, and stators and actuating means supported from said carrier, said actuating means being operable to urge said rotors and stators into frictional engagement, the support means for said rotors comprising a sleeve resiliently mounted on said axle and having a jaw clutch connection with means fixed on one of said wheels.

11. In a railway car truck, a frame, an axle having wheels thereon and journal ends projecting outboard said wheels, journal means on said ends, braking means operable between said wheels and comprising rotors supported for rotation with said wheels, stators interleaved with said rotors and supported from opposite sides of said journal means, and actuating means for urging said rotors and stators into frictional engagement, the support means for said rotors comprising a split sleeve resiliently mounted on said axle and having a positive driving connection with one of said wheels.

12. In a vehicle, a frame, a rotating axle having spaced wheels thereon, journal boxes outboard the wheels, a brake carrier supported at opposite sides of said journal boxes, braking means between said wheels comprising stators supported by said carrier, rotors supported from said axle and driven by one of said wheels, and actuating means on said carrier operable to frictionally engage said rotors and stators, the support means for said rotors comprising a split sleeve resiliently mounted on said axle and having a positive driving connection with one of said wheels, and resilient bushings on said sleeve associated with said rotors respectively for release thereof.

13. In a vehicle, an axle with wheels thereon, braking means intermediate said wheels comprising rigid means resiliently supported from said axle, a rotating brake element slidably mounted on said rigid means, a nonrotating brake element associated with said rotating element, and actuating means for urging said brake elements into frictional engagement.

14. In a brake arrangement for a railway car truck, a frame, a supporting wheel and axle assembly, journal boxes with wing portions, rigid means resiliently connected between the wing portions at opposite sides of the truck, stators and power means supported around said axle from said rigid means, and rotors resiliently supported around said axle for engagement with said stators.

15. In a brake arrangement for a railway car truck, a frame, a supporting wheel and axle assembly, journal boxes with wing portions, rigid means resiliently connected between the wing portions at opposite sides of the truck, stators and power means supported around said axle from said rigid means, and rotors resiliently supported around said axle for engagement with said stators, the support of said rotors comprising a carrier resiliently mounted on said axle.

16. In a brake arrangement for a railway car truck, a frame, a supporting wheel and axle assembly, journal boxes with wing portions, rigid means resiliently connected between the wing portions at opposite sides of the truck, stators and power means supported around said axle from said rigid means, and rotors resiliently supported around said axle for engagement with said stators, the support of said rotors comprising a carrier resiliently fixed to said axle along areas spaced from the middle thereof.

17. In a brake arrangement for a railway car truck, a frame, a supporting wheel and axle assembly, journal boxes with wing portions, rigid means resiliently connected between the wing portions at opposite sides of the truck, stators and power means supported around said axle from said rigid means, rotors resiliently supported around said axle for engagement with said stators, the support of said rotors comprising a carrier resiliently fixed to said axle along areas spaced from the middle thereof, and a positive drive connection between said carrier and means on one of said wheels.

18. In a brake arrangement for a railway car truck, a frame, a supporting wheel and axle assembly, journal boxes with wing portions, rigid means resiliently connected between the wing portions at opposite sides of the truck, stators and power means supported around said axle from said rigid means, rotors resiliently supported around said axle for engagement with said stators, the support of said rotors comprising a carrier resiliently mounted on said axle, and a positive drive connection between said carrier and means on one of said wheels.

19. In a brake arrangement for a railway car truck, a frame, a wheel and axle assembly, wing type journal boxes supported from said axle, springs on said boxes supporting said frame, rigid means resiliently connected between the journal boxes at opposite sides of the assembly, and braking means comprising stators supported around said axle from said rigid means and a carrier resiliently supporting rotors around said axle.

20. In a brake arrangement for a railway car truck, a frame, a wheel and axle assembly, wing type journal boxes supported from said axle, springs on said boxes supporting said frame, rigid means resiliently connected between the journal boxes at opposite sides of the assembly, and braking means comprising stators supported around said axle from said rigid means, a carrier resiliently supporting rotors around said axle, and a positive drive connection between said carrier and one of said wheels.

21. In a brake arrangement for a railway car truck, a frame, a wheel and axle assembly, wing type journal boxes supported from said axle, springs on said boxes supporting said frame, rigid means resiliently connected between the journal boxes at opposite sides of the assembly, and braking means comprising stators supported around said axle from said rigid means, a carrier resiliently supporting rotors around said axle, and resilient means sleeved on said carrier for release of said rotors.

22. In a brake arrangement for a railway car truck, a frame, a supporting wheel and axle assembly, journal boxes with wing portions, rigid means resiliently connected between the wing portions at opposite sides of the truck, stator means and power means supported adjacent said axle from said rigid means, and rotor means supported from said axle for engagement with said stator means.

RAY G. AURIEN.